United States Patent
Schuringa et al.

(10) Patent No.: US 8,094,565 B2
(45) Date of Patent: Jan. 10, 2012

(54) LOOP DETECTION FOR MOBILE IP HOME AGENTS

(75) Inventors: Jon Schuringa, Langen (DE); Jens Bachmann, Langen (DE); Kilian Weniger, Langen (DE); Takashi Aramaki, Osaka (JP)

(73) Assignee: Panasonic Corporation, Osaka (JP)

( * ) Notice: Subject to any disclaimer, the term of this patent is extended or adjusted under 35 U.S.C. 154(b) by 38 days.

(21) Appl. No.: 12/529,299

(22) PCT Filed: Feb. 22, 2008

(86) PCT No.: PCT/EP2008/001417
§ 371 (c)(1),
(2), (4) Date: Oct. 26, 2009

(87) PCT Pub. No.: WO2008/107081
PCT Pub. Date: Sep. 12, 2008

(65) Prior Publication Data
US 2010/0054133 A1 Mar. 4, 2010

(30) Foreign Application Priority Data
Mar. 5, 2007 (EP) .................................. 07004457

(51) Int. Cl.
*H04L 12/26* (2006.01)
(52) U.S. Cl. .......................................... 370/241; 370/392
(58) Field of Classification Search .................. None
See application file for complete search history.

(56) References Cited

U.S. PATENT DOCUMENTS

| | | | |
|---|---|---|---|
| 6,683,865 B1 * | 1/2004 | Garcia-Luna-Aceves et al. | 370/349 |
| 7,362,710 B2 * | 4/2008 | Bitar et al. | 370/241 |
| 7,489,259 B2 * | 2/2009 | Savell | 341/61 |
| 2004/0100951 A1 | 5/2004 | O'Neill | |
| 2004/0117339 A1 | 6/2004 | Thubert | |
| 2006/0285499 A1 * | 12/2006 | Tzeng | 370/249 |
| 2009/0238080 A1 * | 9/2009 | Hirano et al. | 370/241 |

OTHER PUBLICATIONS

International Search Report dated Apr. 3, 2008.
European Search Report dated Jul. 26, 2007.
P. Thubert, et al., "IPv6 Reverse Routing Header and its application to Mobile Networks," Network Working Group, Internet-Draft, Expires: Aug. 18, 2007, draft-thubert-nemo-reverse-routing-header-07, Feb. 2007, pp. 1-51.
N. Jongkeun, "Route Optimization Scheme based on Path Control Header," IETF Standard-Working-Draft, Internet Engineering Task Force, IETF, CH, Apr. 2004, pp. 1-22.

(Continued)

*Primary Examiner* — Kevin C Harper
*Assistant Examiner* — Rhonda Murphy
(74) *Attorney, Agent, or Firm* — Dickinson Wright PLLC

(57) ABSTRACT

The present invention relates to a method and computer-readable medium for loop detection in data packet communication utilizing a tunnel in a network comprising a plurality of nodes. The method comprises the steps of, when a first node transmits a data packet, encoding an identification of the first node in at least two header fields of the data packet to be transmitted, and when the first node receives a data packet, analyzing the at least two header fields of the data packet, deciding if a loop exists by determining if the data packet was sent by the first node itself, based on the analysis of the at least two header fields of the data packet.

8 Claims, 5 Drawing Sheets

OTHER PUBLICATIONS

D. Johnson, et al., "Mobility Support in IPv6," Network Working Group, Request for Comments: 3775, Category: Standards Track, Jun. 2004, pp. 1-165, p. 1, line 17.

A. Conta, "Generic Packet Tunneling in IPv6," Network Working Group, Request for Comments: 2473, Category: Standards Track, Dec. 1998, pp. 1-36, p. 4, line 24.

* cited by examiner

```
+-+-+-+-+-+-+-+-+-+-+-+-+-+-+-+-+-+-+-+-+-+-+-+-+-+-+-+-+-+-+-+-+
| Next Header   |Hdr Ext Len = 0 | Opt Type = 4   |Opt Data Len=1 |
+-+-+-+-+-+-+-+-+-+-+-+-+-+-+-+-+-+-+-+-+-+-+-+-+-+-+-+-+-+-+-+-+
| Tun Encap Lim |PadN Opt Type=1 |Opt Data Len=1 |     0         |
+-+-+-+-+-+-+-+-+-+-+-+-+-+-+-+-+-+-+-+-+-+-+-+-+-+-+-+-+-+-+-+-+
```

```
  Option Type    Opt Data Len   Opt Data Len
  0 1 2 3 4 5 6 7
+-+-+-+-+-+-+-+-+-+-+-+-+-+-+-+-+-+-+-+-+-+-+-+-+
|0 0 0 0 0 1 0 0   |    1       | Tun Encap Lim |
+-+-+-+-+-+-+-+-+-+-+-+-+-+-+-+-+-+-+-+-+-+-+-+-+
```

LOOP DETECTION FOR MOBILE IP HOME AGENTS

BACKGROUND OF THE INVENTION

Field of the Invention

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, whereby the header comprises among other things source and destination IP addresses.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

One of the most commonly used tunneling mechanism is the IP(layer 3)-in-IP(layer 3) encapsulation, which refers to the process of encapsulating an IP-datagram with another IP header and may be used e.g. for Mobile IP. Mobile IPv6—also denoted MIPv6—(see D. Johnson, C. Perkins, J. Arkko, "Mobility Support in IPv6", IETF RFC 3775, June 2004, available at http://www.ietf.org) is an IP-based mobility protocol that enables mobile nodes to move between subnets in a manner transparent for higher layers and applications, i.e. without breaking higher-layer connections. In other words, the mobile nodes remain reachable while moving around in the IPv6 internet network.

Usually, when a terminal powers on, it configures an IP address that is based on the IP address prefix of the access network. If a terminal is mobile, a so-called mobile node (MN), and moves between subnets with different IP prefix addresses, it must change its IP address to a topological correct address due to the hierarchical addressing scheme. However, since connections on higher-layers, such as TCP connections, are defined with the IP addresses (and ports) of the communicating nodes, the connection to the active IP sessions breaks if one of the nodes changes its IP address, e.g. due to movement. One possible protocol to address said problem is the MIPv6 protocol.

The main principle of MIPv6 is that a mobile node is always identified by its Home Address (HoA), regardless of its topological location in the internet, while a Care-of Address (CoA) of the mobile node provides information about the current topological location of the mobile node.

In more detail, a mobile node has two IP addresses configured: a Care-of Address and a Home Address. The mobile node's higher layers use the Home Address for communication with the communication partner (destination terminal), from now on mainly called Correspondent Node (CN). This address does not change and serves the purpose of identification of the mobile node. Topologically, it belongs to the Home Network (HN) of the mobile node. In contrast, the Care-of Address changes on every movement resulting in a subnet change and is used as the locator for the routing infrastructure. Topologically, it belongs to the network the mobile node is currently visiting. One out of a set of Home Agents (HA) located on the home link maintains a mapping of the mobile node's Care-of Address to the mobile node's Home Address and redirects incoming traffic for the mobile node to its current location. Reasons for deploying a set of home agents instead of a single home agent may be e.g. redundancy and load balancing.

Mobile IPv6 currently defines two modes of operation, one of which is bi-directional tunneling (FIG. 1). The other mode is the route optimization mode (FIG. 2), which will be discussed later. In using bi-directional tunneling, data packets sent by the correspondent node 101 and addressed to the home address of the mobile node 102 are intercepted by the home agent 111 in the home network 110. IP-in-IP encapsulation is required because each data packet that is intercepted needs to be resent over the network to the Care-of Address of the MN 102. Accordingly, each intercepted data packet is included as the payload in a new IP data packet addressed to the CoA of the MN 102 and tunneled to the MN 102, which is located at the foreign network 120. The start of the corresponding tunnel is the Home Agent 111, which carries out the encapsulation, and the end is the mobile node 102. It might also be possible that a local agent in the foreign network 120 receives messages on behalf of the mobile node, strips off the outer IP header and delivers the decapsulated data packet to the mobile node (not shown).

Data packets sent by the mobile node 102 are reverse tunneled to the home agent 111, which decapsulates the packets and sends them to the correspondent node 101.

Reverse tunneling means that packets are tunneled by the mobile node to the home agent in a "reverse" manner to the "forward" tunnel.

Regarding this operation in MIPv6 only the Home Agent 111 is informed about the Care-of Address of the mobile node 102. Therefore, the mobile node sends Binding Update (BU) messages to the Home Agent. These messages are advantageously sent over an IPsec security association, and are thus authenticated and integrity protected.

FIG. 3 shows a diagram of an exemplary data packet exchange between a CN 101 and a MN 102 via the Home Agent 111 of the MN 102, wherein the packet format during the communication is illustrated in detail. It is assumed that all communication between the CN and the MN is conducted via the MN's HA 111, that is, no route optimization has been performed. Consequently, the IP header of a data packet transmitted from the CN to the MN contains the Home Address of the MN as destination address, and the IP address of the CN as the source address. In accordance with the destination address of the packet being the Home Address of the MN, the data packet is routed to the Home Network, and then to the Home Agent of the MN.

As explained above, upon receiving the data packet, the HA applies the IP-in-IP encapsulation based on MIPv6 procedures and sends the encapsulated packet to the MN. In other words, the HA tunnels the received data packets to the MN by applying the IP-in-IP encapsulation. More specifically, the HA adds another IP header to the packet, comprising its own address as the source address, and the Care-of Address of the MN as the destination address of the additional header. As apparent from FIG. 3 this augments the packet size with another 40 bytes.

Similarly, data packets that are returned by the MN are encapsulated with two IP headers. The outer header relates to the tunneling of the data packet to the HA, and accordingly includes the address of the HA as the destination address, and the Care-of Address of the MN as the source address. The inner IP header includes the CN's address as the destination, and the MN's Home Address as the source address.

In brief, Mobile IPv6 works as follows. A mobile node (MN) can have two addresses—a permanent home address (HoA) and a care-of address (CoA), which is associated with the network the mobile node is visiting. A home agent (HA) stores information about mobile nodes whose permanent address is in the home agent's network.

A node wanting to communicate with the mobile node uses the home address of the mobile node to send packets. These packets are intercepted by the home agent, which uses a table and tunnels the packets to the mobile node's care-of address with a new IP header, preserving the original IP header. The packets are decapsulated at the end of the tunnel to remove the added IP header and delivered to the mobile node.

As mentioned above, a mobile node can be registered at multiple home agents, for different reasons. When registered at multiple home agents, the mobile node has multiple home addresses and for each of those a care-of address can be specified. This can be used by a malicious host to construct bindings in such a way that loops will be created. An example is shown in FIG. 4, where a loop exists consisting of three home agents. Packets destined for the mobile node get stuck in the loop and may create high load in the network. This could be used for denial of service attacks. Because of possibly encrypted packets, the loop detection is non trivial.

As explained above, encapsulation is the process of prepending a new header to the original packet. At encapsulation, the source field of the tunnel header is set to the address of the tunnel entry-point node, and the destination field with an IPv6 address of the tunnel exit-point. Subsequently, the tunnel packet resulting from encapsulation is sent towards the tunnel exit-point node.

The forwarding by the home agent as described above makes use of encapsulation.

Nested IPv6 encapsulation is the encapsulation of a tunnel packet. It takes place when a hop of an IPv6 tunnel is a tunnel. The tunnel containing a tunnel is called an outer tunnel. The tunnel contained in the outer tunnel is called an inner tunnel. Inner tunnels and their outer tunnels are nested tunnels.

In RFC2473, "Generic Packet Tunnelling in IPv6 Specification", a method is described to limit nested encapsulation. Nested encapsulation is the encapsulation of an encapsulated packet.

Since each encapsulation adds a non-zero number of bytes to the packet, nested encapsulation is naturally limited to the maximum IP packet size. However, this limit is so large that it is not effective.

RFC2473 proposes a mechanism for limiting excessive nested encapsulation with a "Tunnel Encapsulation Limit" option, which is carried in an IPv6 Destination Options extension header accompanying an encapsulating IPv6 header, see FIGS. 9 and 10.

From RFC2473: "The Tunnel Encapsulation Limit option specifies how many additional levels of encapsulation are permitted to be prepended to the packet—or, in other words, how many further levels of nesting the packet is permitted to undergo—not counting the encapsulation in which the option itself is contained. For example, a Tunnel Encapsulation Limit option containing a limit value of zero means that a packet carrying that option may not enter another tunnel before exiting the current tunnel."

In case of the loop between Home Agents, a so called "recursive nested encapsulation" will occur, and the method in RFC2473 prevents that the packets loop forever, but it does not prevent packets to enter the loop. Thus it does not remove the loop.

A Tunnel Encapsulation Limit value can indicate whether the entry-point node is configured to limit the number of encapsulations of tunnel packets originating on that node. The IPv6 Tunnel Encapsulation Limit is the maximum number of additional encapsulations permitted for packets undergoing encapsulation at that entry-point node. The recommended default value is 4. An entry-point node configured to limit the number of nested encapsulations prepends a Destination Options extension header containing a Tunnel Encapsulation Limit option to an original packet undergoing encapsulation—see above.

If a Tunnel Encapsulation Limit option is found in the packet entering the tunnel and its limit value is non-zero, an additional Tunnel Encapsulation Limit option must be included as part of the encapsulating headers being added at this entry point. The limit value in the encapsulating option is set to one less than the limit value found in the packet being encapsulated.

In Mobile IP, mobile nodes that are away from home have a binding at the home agent that binds the mobile's node home address to its current care-of address. A mobile node that is registered at multiple home agents, could setup the binding in such a way that a loop exists. Packets destined for the mobile node would then never arrive at the mobile node, and might create a heavy traffic load between the home agents. This could be used for denial of service attacks. Because of possibly encrypted packets, the loop detection is non-trivial.

The goal is to detect encapsulation loops, so that the needed action to break the loop can be taken by the home agent. The difficulty is that packets get a new packet header and are possibly encrypted (as part of the encapsulation) at each home agent in the loop. Therefore, the receiving home agent cannot tell, without any other means, that this packet was originated at itself.

As mentioned, the home agents may encrypt packets during the loop. Because these are packets destined for the MN, only the MN can decrypt the contents. But in case of a loop, that packet will never arrive at the MN, so it is impossible to decrypt it (in general).

It should be noted that a loop detection solution that allows changes to the implementation of all the home agents in the loop, would be trivial. The home agents could just communicate with each other about the existence of loops.

The aim is that a solution should work together with unmodified home agents in the loop. At least one home agent in the loop is needed to use this invention.

SUMMARY OF THE INVENTION

The present invention has been made in consideration of the situation above and has as its object to detect loops while not needing to modify any of the existing hardware.

This object is solved by the invention as claimed in the independent claims. Preferred embodiments of the invention are defined by the dependent claims.

To achieve this object, the present invention provides a method and computer-readable medium for loop detection in data packet communication utilizing a tunnel in a network comprising a plurality of nodes. The method comprises the steps of, when a first node transmits a data packet, encoding an identification of the first node in at least two header fields of the data packet to be transmitted, and when the first node receives a data packet, analysing the at least two header fields of the data packet, deciding if a loop exists by determining if the data packet was sent by the first node itself, based on the analysis of the at least two header fields of the data packet.

According to an advantageous embodiment the first node is a home agent or a router.

According to another embodiment of the invention the at least two header fields are tunnel encapsulation limit fields of an extended IPv6 header.

In a further embodiment of the invention the step of analysing comprises comparing the at least two header fields of the data packet with the encoded identification of the first node. If the at least two header fields originate at the first node, it is decided that the loop exists, otherwise it is decided that no loop exists.

Another embodiment of the invention comprises the step of reducing the value of each byte in the tunnel encapsulation limit field by 1 in each node in the network that encapsulates the data packet further.

According to another embodiment the step of comparing comprises subtracting the individual bytes of the tunnel encapsulation limit from the individual bytes of the encoded identification of the first node, deciding that the loop exists if the resulting bytes are the same.

In another embodiment of the invention the data packet is a binding refresh advice packet.

Another advantageous embodiment of the invention further comprises the step of, upon decision that a loop exists, receiving a binding update within a given time from transmission of the binding refresh advice packet, deciding that no loop exists.

BRIEF DESCRIPTION OF THE DRAWINGS

Further features and advantages will become apparent from the following, and more particular description of the various embodiments of the invention as illustrated in the accompanying drawings wherein.

DETAILED DESCRIPTION OF THE INVENTION

The following paragraphs will describe various embodiments of the invention, and illustrate further alternative configurations.

For exemplary purposes only most of the embodiments are outlined in relation to an IPv6 system and the terminology used in the subsequence sections mainly relates to the IPv6 terminology. However, the terminology used and the description of the embodiments with respect to a IPv6 architecture is not intended to limit the principles and ideas of the invention to such systems.

Also the detailed explanations given in the technical background section above are merely intended to better understand the mostly IPv6 specific exemplary embodiments described in the following, and should not be understood as limiting the invention to the describe specific implementations.

Although this invention targets loop detection between home agents, the key idea could be used for detecting other loops as well.

The main idea is to make use of existing technique as defined in RFC2473. That document defines a "tunnel encapsulation limit" field that can be used to limit the number of encapsulations that are allowed for that packet. The limit (a field containing 8 bits) is decreased by one at each entry of a tunnel. The main idea of this invention is to use multiple of these fields in one packet. By encoding a sender-ID into these fields, the original sender is able to detect that that specific packet was actually sent by itself, and this indicates a loop.

The "tunnel encapsulated limit" is part of an IPv6 extension header, and a standard IPv6 complying router (or home agent), reduces the limit by one, for each extension header in the packet. So, if the original sender-ID contains 4 bytes, 4 header extensions each with a 1-byte encapsulation limit, will be contained in the loop detection packet header.

Thus, all encoded sender-ID bytes will be decreased by a value, corresponding to the length of the loop, upon reception by the original sender. Note that using only 1 byte as the sender-ID will not be sufficient to detect the loop, since the sender would not be able to distinguish between its own ID and that of possible other home agent. So, at least 2 bytes are needed for the sender-ID; any additional byte decreases the possibility of a collision with other home agent IDs.

Figure 1:
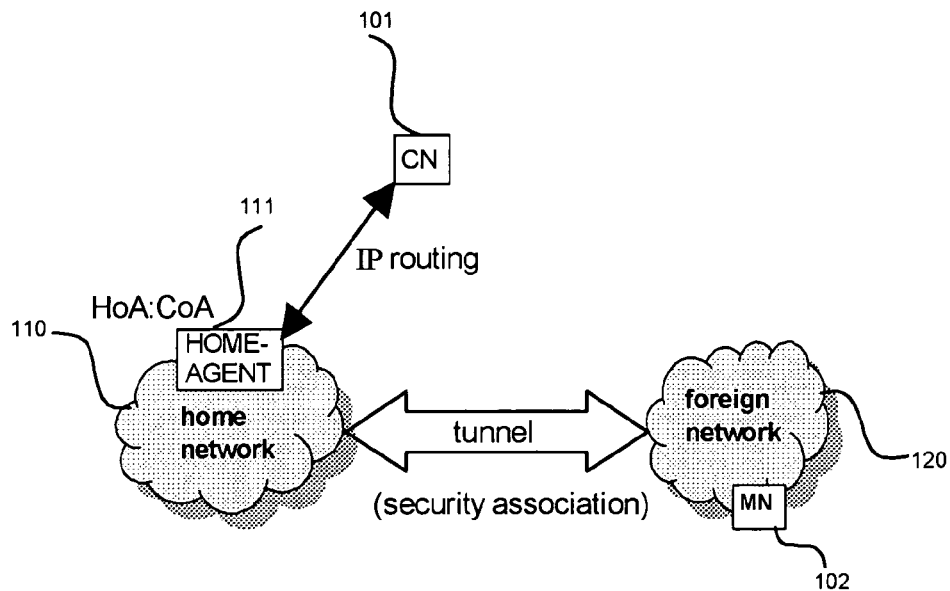
FIG. 1 depicts a model of a MIPv6 network including a tunnel.
Figure 2:
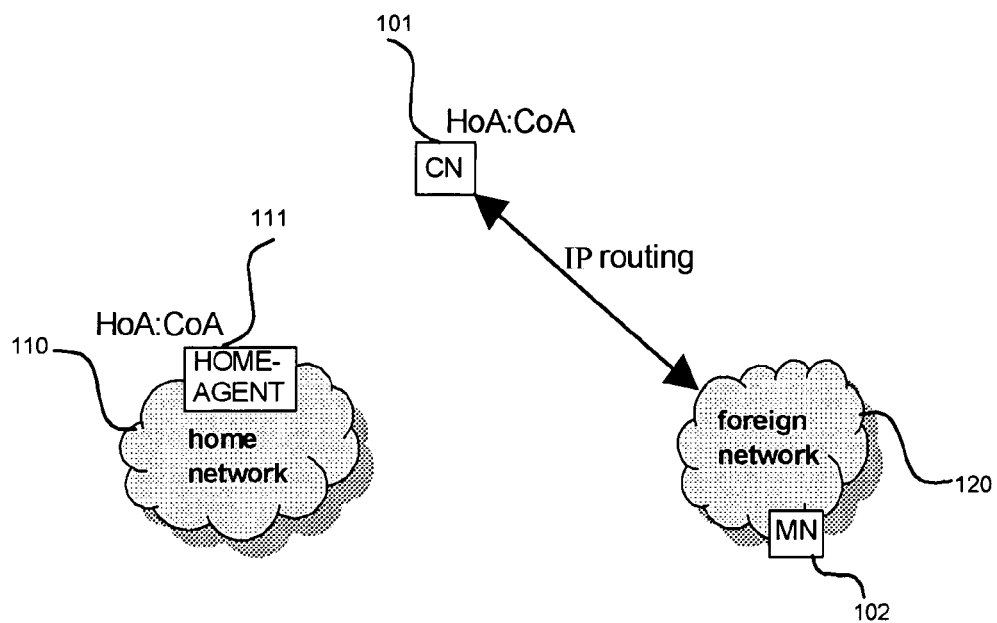
FIG. 2 shows the routing between a CN and an MN.
Figure 3:
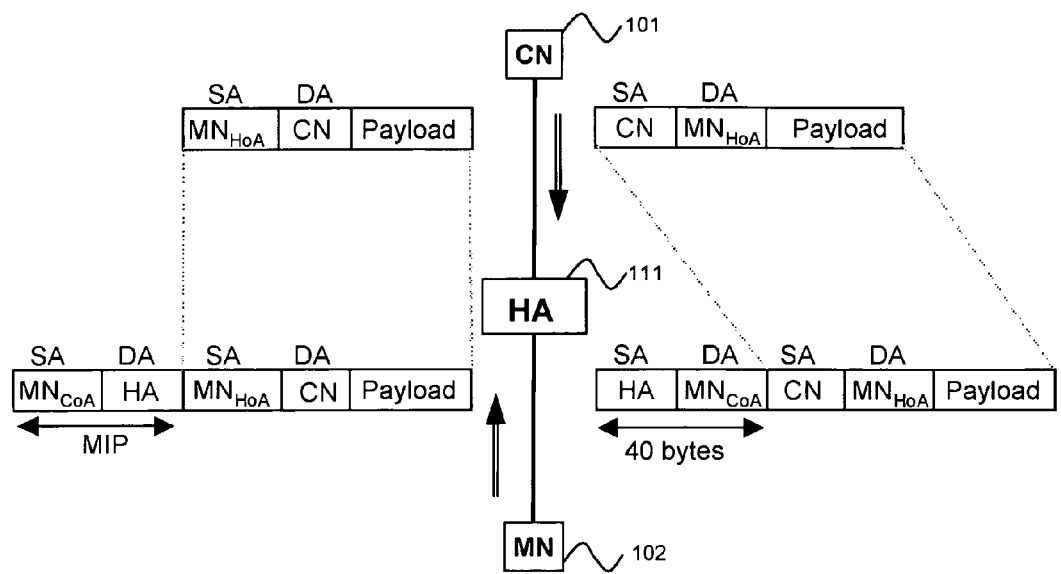
FIG. 3 shows the headers used in MIPv6.
Figure 4:
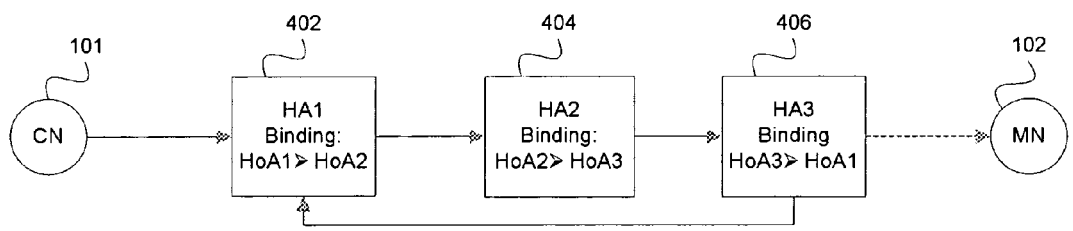
FIG. 4 shows that a loop can be created for a mobile, which is registered at multiple home agents.

In FIG. 4, an MN 102 is shown which is registered at three home agents 402, 4004, 406. At each home agent it has set up a binding, from the MN's home address to its care-of address, in such a way that the bindings form a loop. Any packet destined for the MN 102 will get caught in the loop. This situation could be created by a malicious host, to generate heavy traffic on the links between the home agents.

Figure 5:
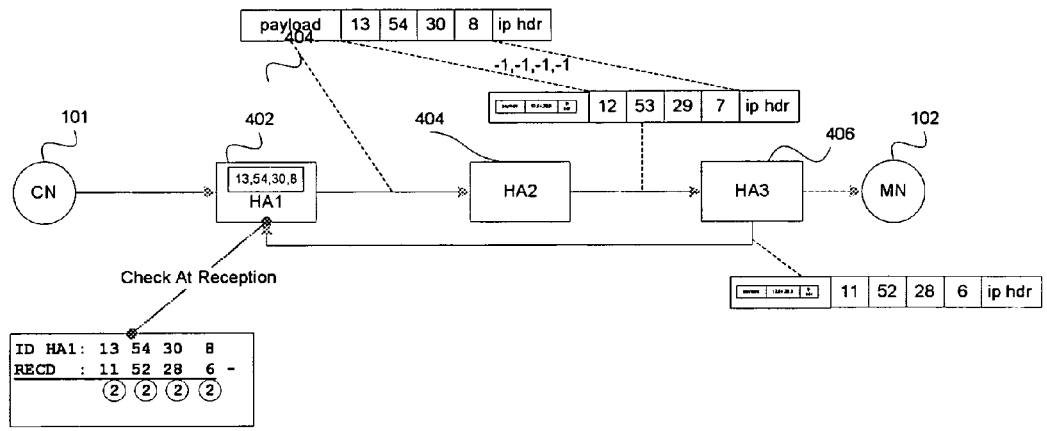
FIG. 5 shows the main idea where a loop detection packet is originated at a home agent and eventually is received by this home agent.

This situation in clearly not desired and should be detected so that action can be taken. The main idea of this invention is illustrated in FIG. 5.

In this figure, a loop exists at the home agents for packets destined for the MN 102. In the figure it is assumed that HA1 402 suspects a loop and starts the loop detection procedure. It does this by generating the "loop detection packet" with, in this case, four tunnel encapsulation limit options. HA1 402 writes its own ID (13,54,30,8) into the packet, and sends it to the care-of address of the MN 102 as registered at HA1 402.

HA2 404, which can be a standard conform IPv6 home agent, processes this packet like any other packet for the MN 102. Because the MN 102 is currently not at home at HA2 404, it encapsulates the packet and sends it to the care-of address as registered at HA2 404. By doing this, it decreases the tunnel encapsulation limit fields of the original packet. The tunnel encapsulation limit header options are copied from the original packet; the limit is decreased and placed as option headers in the new packet.

The result is that the original ID of HA1 402, is still inside the packet and is not encrypted. Its individual bytes are only decreased by one. HA3 406 will do exactly the same as HA2 404, resulting in a packet arriving at HA1 402. Upon reception HA1 402, compares the received values with its own ID, and if all numbers are equal, this probably indicates a loop. The main idea of the loop detection is to compare the received number with the home agent's own ID. This is done by subtracting the individual parts (bytes) of both numbers. There are other computations possible to reach the same effect.

Next to subtraction, other mathematical procedures are possible to detect a loop. In the following one such method is described. Assume the home agent ID consists of the four numbers a1 ... a4, and the received numbers in the packet are r1 ... r4.

The first step is to calculate the differences between the individual numbers of the home agent ID, this is m1=a2−a1, m2=a3−a2 and m3=a4−a3.

Next the received numbers and the ID are summed: s1=a1+r1, s2=a2+r2, s3=a3+r3 and s4=a4+r4.

Again, the differences between the individual numbers of S is calculated: n1=s2−s1, n2=s3−s2 and n3=s4−s3.

Now, there is a loop if and only if:

$$n1/m1=2$$

$$n2/m2=2$$

$$n3/m3=2$$

Thus if the division results in exactly 2, at all three divisions, then there is a loop, otherwise there is none.

Once a loop is detected the HA can simply delete the binding for that MN to break the loop. Packets destined for the MN will be discarded. Standard mobile IP time out mechanisms will eventually discard the bindings at the other home agents.

Multiple methods could be used to assign Ids to home agents for the loop detection method. A simple way would be to assign the ID manually or generate it randomly. Another possibility is to base the number on other numbers that uniquely define the HA like the home agents IP address.

Note that a home agent does not does not know beforehand which other home agents could be involved in a loop.

Therefore, there is a probability that another home agent in the loop uses exactly the same ID. However, the probability of cases of "ID-collision" could be made arbitrarily small by increasing the number of bits of the ID.

Even if the IDs of two home agents are different, a collision could occur. Consider the case where ID 1=5, 5, 5 and ID2=8, 8, 8. If a loop detection packet arrives with e.g. 2, 2, 2 the HA1 might think that this packet originated at itself, while HA2 thinks exactly the same.

Figure 6:
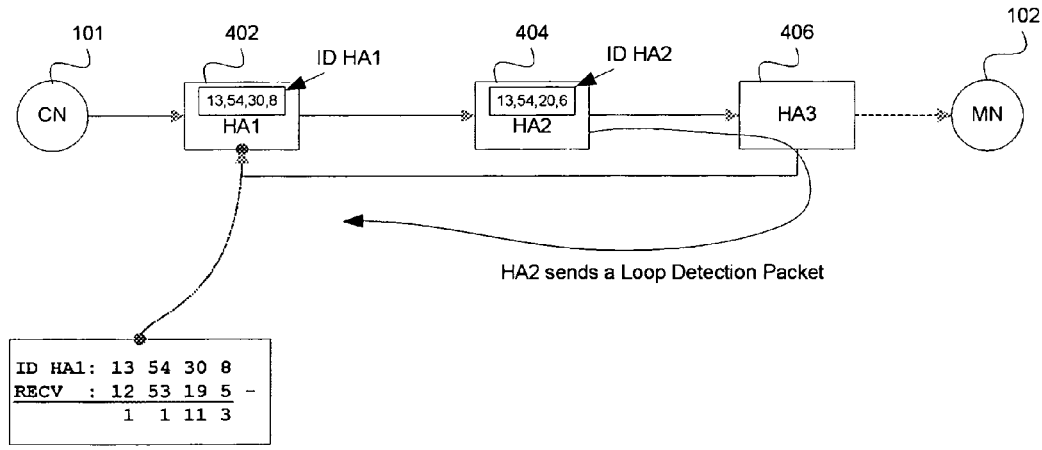
FIG. 6 shows an example how a loop detection packet originated at a different home agent as the receiver can be detected.

FIG. 6 illustrates the case when HA2 404 instead of HA1 402 starts with the loop detection procedure. Because HA2 404 started, it generated a loop detection packet with its own id encoded in it (13,54,20,6). When this packet arrives at HA1 402, the original numbers are all decreased by one. HA1 402 now compares the received numbers with its own ID by subtracting all numbers individually. As shown in the figure, the subtraction produces the numbers 1,1,11,3, which are not all equal, and therefore HA1 402 knows that this loop detection packet was not originated at HA1 402.

Because a home agent loop could be used by malicious hosts to create a Denial of Service attack on the home agents, the solution to detect the loops should be secure also. The main idea of loop detection as explained in the previous paragraphs still holds, but some additions are needed to make it secure.

Until now, we did not exactly define the loop detection packet. For the main idea, it basically is also not important what kind of packet is actually used. However, in the light of possible attackers, it becomes important. This has to do with the fact that an attacker may intervene with the loop detection process. There are basically two problems that need to be solved:

There is no loop, but an attacker makes the home agent believe there is one.

There is a loop but the attacker disables the detection.

Figure 7:
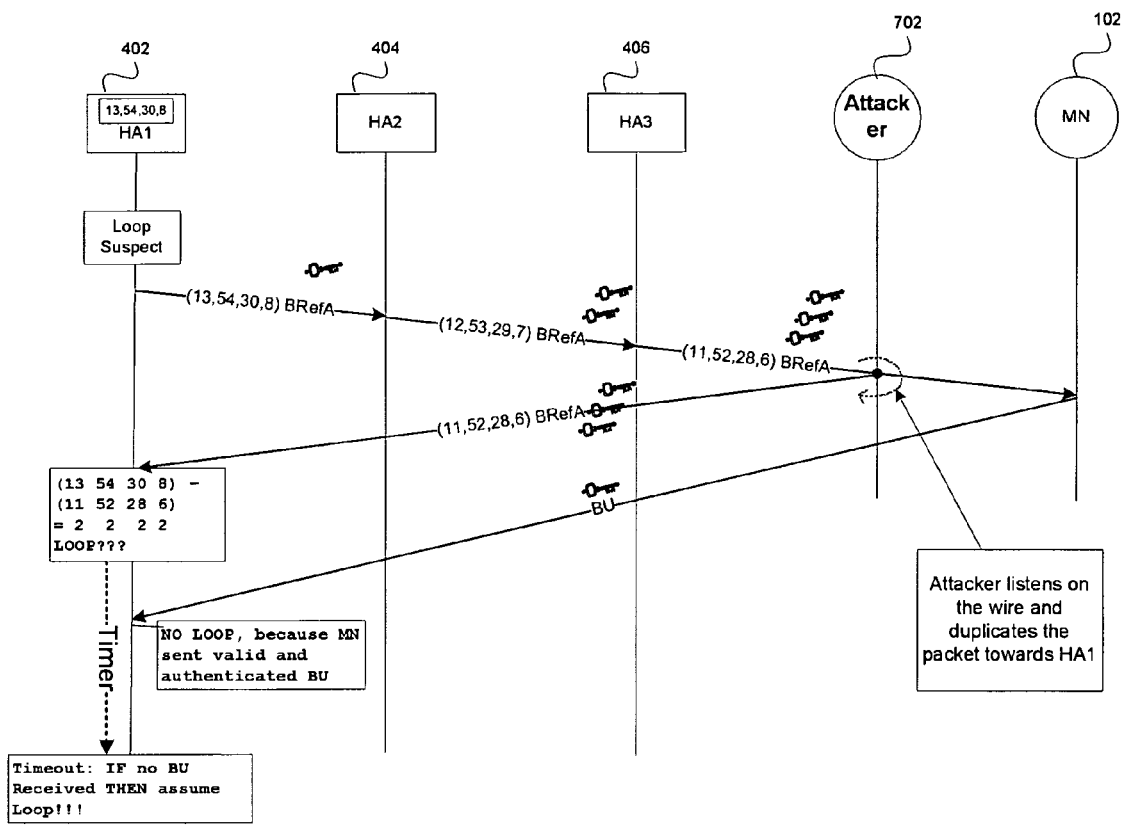
FIG. 7 shows an attacker trying to mimic a loop, although none exists.

FIG. 7 shows the scenario for the first case where HA1 402 starts a loop detection procedure, by sending a loop detection packet to the MN 402. There is however an attacker 702 that can listen to the packets send to the MN 102. If this attacker 702 duplicates the loop detection packet back to the HA, the HA might falsely detect a loop.

The solution to the problem described above, consists of multiple elements. Firstly, the packet used for loop detection is a "Binding Refresh Advice" (actually this is a binding acknowledgement packet with an optional binding refresh advice) as per RFC 3557. With a binding refresh advice, a home agent is able to force a MN to refresh its binding before the normal end of its lifetime. The point in using this message is twofold: first, an unmodified MN is able to respond to this message, and secondly, it can respond securely to this request.

So the complete secure loop detection procedure from the home agent viewpoint is as follows:

If the home agent suspects a loop for a particular MN, is creates a Binding Refresh Request for this MN. The home agent includes its ID in the form of tunnel encapsulation limit option headers.

If a loop detection packet is received and the numbers in the packet match with the home agent ID, then this may indicate a loop or an attacker. To find this out, the home agent starts a timer. If within this time an authenticated Binding Update is received from the MN, then there is no loop. Otherwise there is a loop. Note that it is assumed that the Attacker cannot throw away packets going to the MN, nor packets coming from the MN.

Figures 8, 9, 10:
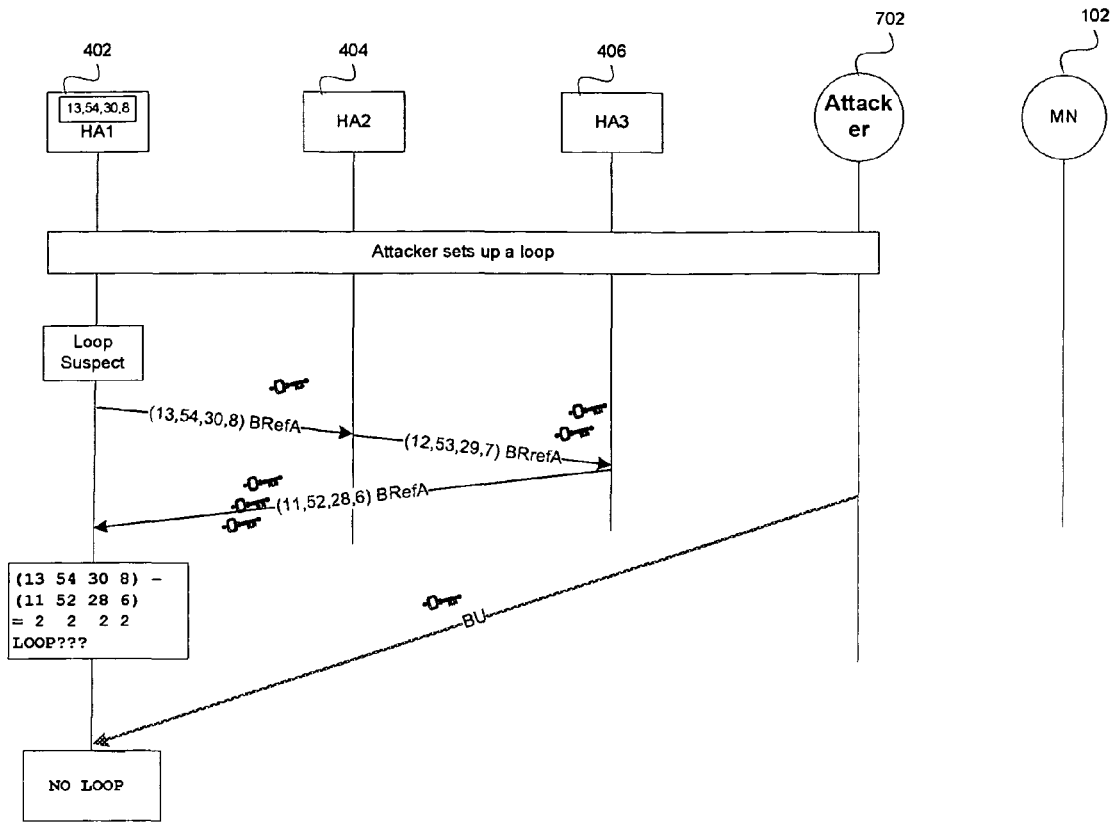
FIG. 8 shows an attacker trying to disable the loop detection.
FIG. 9 depicts the extended mobile IPv6 header.
FIG. 10 shows the format of the tunnel encapsulation limit field.

The second security problem is that an attacker might set up a loop, but disables the detection. The principle is shown in FIG. 8. If the attacker 702 pretends to be the MN 102 and sends the BU to the home agent, the home agent might think there is no loop.

This problem is already solved because of the use of authenticated "binding refresh advice" and the corresponding "binding update". The attacker 702 can only send this binding update if it has the key of the MN, and therefore this second security issue is not considered to be a problem.

The main idea for loop detection could use any packet type for the detection procedure. Namely, if there is a loop, that packet will arrive back at the home agent, and can inspect it. However, as apparent from the above, for security the use of a binding refresh request has advantages in case of the existence of attackers. But other messages may fulfill this purpose also. What is important is that the home agent can verify that the reply from the MN came indeed from the MN and not from some other entity.

Further, the various embodiments of the invention may also be implemented by means of software modules which are executed by a processor for or directly in hardware. Also a combination of software modules and hardware implementation may be possible. The software modules may be stored in any kind of computer readable storage medium, for example RAM, EPROM, EEPROM, flash memory, registers, hard disks, CD-ROM, DVD, etc.

The invention claimed is:

1. A method for loop detection in data packet communication utilizing a tunnel in a network comprising a plurality of nodes, the method comprising the steps of:
   when a first node transmits a data packet:
      encoding an identification of the first node in at least two header fields of the data packet to be transmitted, and
   when the first node receives a data packet:
      analyzing at least two header fields of the received data packet, and deciding if a loop exists by determining if the received data packet is the transmitted data packet sent by the first node itself, based on the analysis of the at least two header fields of the received data packet, wherein the at least two header fields of the transmitted data packet and the received data packet are tunnel encapsulation limit fields of an extended IPv6 header, and the method further comprises the step of:

reducing a value of bytes in the tunnel encapsulation limit fields by 1 in each node in the network that further encapsulates the transmitted data packet.

2. The method according to claim 1, wherein the first node is a home agent or a router.

3. The method according to claim 1, wherein the step of analyzing comprises:

comparing the at least two header fields of the received data packet with the encoded identification of the first node, if the at least two header fields of the received data packet originate at the first node, deciding that the loop exists, otherwise, deciding that the loop does not exist.

4. The method according to claim 3, wherein the step of comparing comprises:

subtracting individual bytes of the tunnel encapsulation limit fields in the received data packet from respective individual bytes of the encoded identification of the first node, and deciding that the loop exists if each of the resulting bytes from the subtracting are the same.

5. The method according to claim 1, wherein the transmitted data packet is a binding refresh advice packet.

6. The method according to claim 5, wherein the step of deciding that the loop exists further comprises:

determining whether a binding update has been received within a given time from transmission of the binding refresh advice packet, and deciding that the loop does not exist if the binding update has been received within the given time.

7. A non-transitory computer readable medium storing instructions that, when executed by a processor of a node, cause the node to detect a loop in data packet communication utilizing a tunnel in a network comprising a plurality of nodes, by performing a method comprising the steps of:

when a first node transmits a data packet:

encoding an identification of the first node in at least two header fields of the data packet to be transmitted, and when the first node receives a data packet:

analyzing at least two header fields of the received data packet, and deciding if a loop exists by determining if the received data packet is the transmitted data packet sent by the first node itself, based on the analysis of the at least two header fields of the received data packet, wherein the at least two header fields of the transmitted data packet and the received data packet are tunnel encapsulation limit fields of an extended Ipv6 header, and the method further comprises the step of:

reducing a value of bytes in the tunnel encapsulation limit field by 1 in each node in the network that further encapsulates the transmitted data packet.

8. The non-transitory computer readable medium according to claim 7, wherein the first node is a home agent or a router.

* * * * *